United States Patent
Franz (10) Patent No.: US 9,347,843 B2
(45) Date of Patent: May 24, 2016

(54) LOW-HEIGHT SENSOR FOR MEASURING TORQUE ANGLE

(71) Applicant: Bourns, Inc., Riverside, CA (US)

(72) Inventor: Roland Franz, Novi, MI (US)

(73) Assignee: BOURNS, INC., Riverside, CA (US)

( * ) Notice: Subject to any disclaimer, the term of this patent is extended or adjusted under 35 U.S.C. 154(b) by 0 days.

(21) Appl. No.: 14/472,139

(22) Filed: Aug. 28, 2014

(65) Prior Publication Data

US 2016/0061673 A1    Mar. 3, 2016

(51) Int. Cl.
*G01L 3/10*    (2006.01)

(52) U.S. Cl.
CPC .............. *G01L 3/102* (2013.01); *G01L 3/104* (2013.01)

(58) Field of Classification Search
CPC ......... G01L 3/101; G01L 3/102; G01L 3/108; G01L 3/10; G01L 3/104; G01L 5/221
USPC ........ 73/862.325, 862.331–862.338, 862.333
See application file for complete search history.

(56) References Cited

U.S. PATENT DOCUMENTS

| | | | |
|---|---|---|---|
| 4,984,474 A | 1/1991 | Matsushima et al. | |
| 6,701,792 B2* | 3/2004 | Laidlaw | 73/862.329 |
| 6,810,336 B2 | 10/2004 | Nakane et al. | |
| 6,912,923 B2 | 7/2005 | Froehlich et al. | |
| 7,028,545 B2* | 4/2006 | Gandel et al. | 73/328 |
| 7,644,635 B2* | 1/2010 | Prudham et al. | 73/862.334 |
| 7,784,365 B2 | 8/2010 | Masson et al. | |
| 8,448,528 B2* | 5/2013 | McDonald et al. | 73/862.331 |
| 8,776,619 B2* | 7/2014 | Jammer | 73/862.333 |
| 2010/0180696 A1* | 7/2010 | Islam et al. | 73/862.332 |
| 2011/0126639 A1 | 6/2011 | Behrens | |
| 2011/0167920 A1 | 7/2011 | Rink et al. | |
| 2013/0125670 A1 | 5/2013 | Jammer | |
| 2014/0123770 A1 | 5/2014 | Lee | |

FOREIGN PATENT DOCUMENTS

WO    2011145820 A2    11/2011

OTHER PUBLICATIONS

Bosch, "Bosch Mobility Solutions, Torque Sensor Steering," http://www.bosch-mobility-solutions.com/en/de/_technik/component/SF_PC_ST_Sensors, 2014 (1 page).

(Continued)

*Primary Examiner* — Lisa Caputo
*Assistant Examiner* — Octavia Hollington
(74) *Attorney, Agent, or Firm* — Michael Best & Friedrich LLP (57) ABSTRACT

A sensor for measuring a torque angle. The sensor includes a magnet, a first stator, a second stator, a first collector, a second collector, and a magnetic sensing element. The first stator includes a first horizontal ring section located on a first plane, and a plurality of first teeth extended from the first horizontal ring section, the plurality of teeth located on a second plane. The second stator includes a second horizontal ring section located on the second plane, and a plurality of second teeth extended from the second horizontal ring section, the plurality of second teeth located on the second plane. The first collector is located proximate the first horizontal ring section and the second collector is located proximate the second horizontal ring section. The magnetic sensing element is magnetically coupled to the first collector the second collector.

20 Claims, 7 Drawing Sheets

(56) References Cited

OTHER PUBLICATIONS

Robert Bosch GMBH "Torque Sensor Steering" accessed online Dec. 1, 2014 <http://www.bosch-mobility-solutions.com/en/de/_technik/component/SF_PC_ST_Sensors_SF_PC_Steering-Systems_1922.html?compId=1109#>.

International Search Report and Written Opinion for Application No. PCT/US2015/045498 dated Oct. 30, 2015 (15 pages).

\* cited by examiner

LOW-HEIGHT SENSOR FOR MEASURING TORQUE ANGLE

BACKGROUND

The present invention relates to torque sensors. More particularly, torque sensors configured to measure a torque angle across a torsion bar between a set of shafts, most typically in an automotive steering system.

A torque may be measured in a system that has an input shaft and output shaft and a compliant shaft or torsion bar that connects the two shafts. A magnetic sensor is fitted on or placed at the interface of the two shafts. The sensor may include a magnet, a pair of stators, a pair of collectors, and one or more magnetic sensing elements. The torsion bar has a known spring constant or torsional rigidity. Rotational movement of the input shaft with respect to the output shaft produces a relative angular displacement between the two. The angular displacement is proportional to the torque exerted on the input shaft (such as by a person turning a steering wheel). The angular displacement is then measured using known magnetic principles.

SUMMARY

Although torque angle sensors are typically known, they are not fully satisfactory. In many designs, the torque angle sensors are bulky and oversized in the axial direction. This is due to the fact that the magnet is typically a magnet having a radial magnetic flux. In typical designs, the radial magnet (attached to a first end of a torsion bar) rotates inside a stator assembly (attached to a second end of the torsion bar). The stator assembly typically includes two stators having stator rings and a plurality of teeth. The teeth extend from the stator rings axially at ninety-degree angles and surround the radial magnet. As torque is applied across the torsion bar, the magnet rotates relative to the stator assembly, thus creating a varying magnet field between the two stators. The magnetic field is detected by two collectors and concentrated across magnetic sensor elements, which convert the magnetic field information into electrical signals.

In one embodiment of the invention, a sensor for measuring a torque angle is provided. In one particular embodiment, the sensor includes a magnet, a first stator, a second stator, a first collector, a second collector, and a magnetic sensing element. The first stator includes a first horizontal ring section located on a first plane, and a plurality of first teeth extended from the first horizontal ring section. The first plurality of teeth is located on a second plane. The second stator includes a second horizontal ring section located on the second plane, and a plurality of second teeth extended from the second horizontal ring section. The plurality of second teeth is located on the second plane. The first collector is located proximate the first horizontal ring section and the second collector is located proximate the second horizontal ring section. The magnetic sensing element is magnetically coupled to the first collector and the second collector.

In another embodiment, the invention provides a sensor for measuring steering shaft torque. In one particular embodiment, the sensor includes a ring magnet, a first stator, a second stator, a first collector, a second collector, and a magnetic sensing element. The ring magnet includes a top portion, a bottom portion, and an outer portion. The first stator includes a first horizontal ring encompassing the outer portion of the ring magnet, and a plurality of first teeth extended from the first horizontal ring section. The plurality of teeth is proximate the bottom portion of the ring magnet. The second stator includes a second horizontal ring section encompassing the outer portion of the ring magnet, and a plurality of second teeth extended from the second horizontal ring section. The plurality of second teeth is proximate the bottom portion of the ring magnet. The first collector is located proximate the first horizontal ring section and the second collector is located proximate the second horizontal ring section. The magnetic sensing element is magnetically coupled to the first collector and the second collector.

In another embodiment the invention provides a method of measuring steering shaft torque. The method including providing a ring magnet having an axial magnetic flux, an outer portion, and a bottom portion. The method further including providing a first stator having a first stator ring surrounding the outer portion of the ring magnet, and a plurality of first teeth extending from the first stator ring, the plurality of first teeth proximate the bottom portion of the ring magnet. The method further including providing a second stator having a second stator ring surrounding the outer portion of the ring magnet, and a plurality of second teeth extending from the second stator ring, the plurality of second teeth proximate the bottom portion of the ring magnet. The method further including providing a first collector located proximate the first stator ring; providing a second collector located proximate the second stator ring; and sensing the magnet flux flowing through the first stator, the second stator, the first collector, and the second collector.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
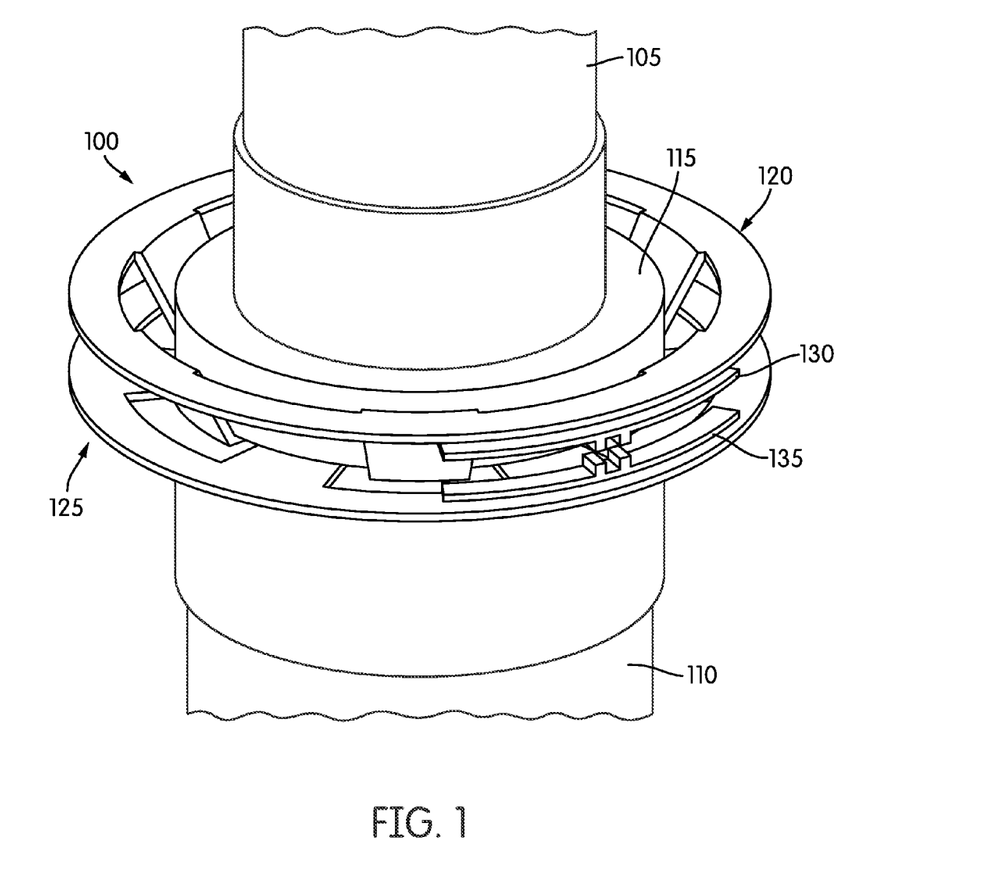
FIG. 1 is a perspective view of a sensor according to one embodiment of the present invention coupled to an input shaft and an output shaft.

FIG. 1 illustrates an exemplary sensor 100 for measuring a torque angle between an input shaft 105 and an output shaft 110. The sensor 100 includes a magnet 115, a first stator 120, a second stator 125, a first collector 130, and a second collector 135. The magnet 115 is coupled to the input shaft 105, while the first stator 120 and second stator 125 are coupled to the output shaft 110. The input shaft 105 and output shaft 110 are connected via a torsion bar (not shown). The torsion bar has a torsional rigidity or torsion spring constant of a predetermined or known amount. Rotational motion of the input shaft 105 relative to the output shaft 110 produces a relative angular displacement between the output shaft 110 and input shaft 105 proportional to the torque exerted.

Figure 2A:
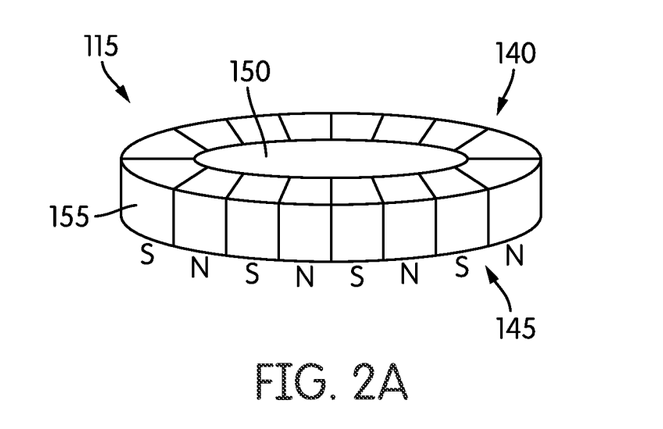
FIG. 2A is a perspective view of a magnet of the sensor of FIG. 1.
Figure 2B:
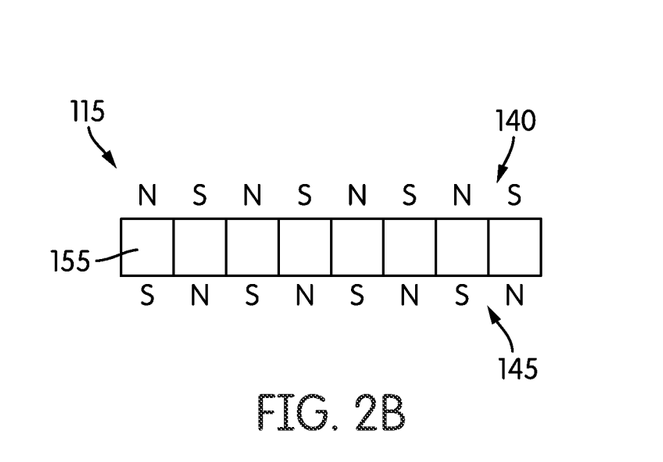
FIG. 2B is a front view of the magnet of FIG. 2A.

FIGS. 2A and 2B illustrate one embodiment of the magnet 115. The magnet 115 is a multi-pole ring-shaped magnet having a plurality of alternating north poles N and south poles S on an axial face of the magnet 115. The magnet 115 includes a top portion 140, a bottom portion 145, an inner portion 150, and an outer portion 155. In the illustrated embodiment, the magnet 115 is magnetized in the axial direction having an axial magnetic flux (i.e., a magnetic flux which flows in the axial direction from a north pole N to a south pole S). In another embodiment, the magnet 115 is not magnetized purely in the axial direction, but still includes north poles N and south poles S on the bottom portion 145.

Figure 3A:
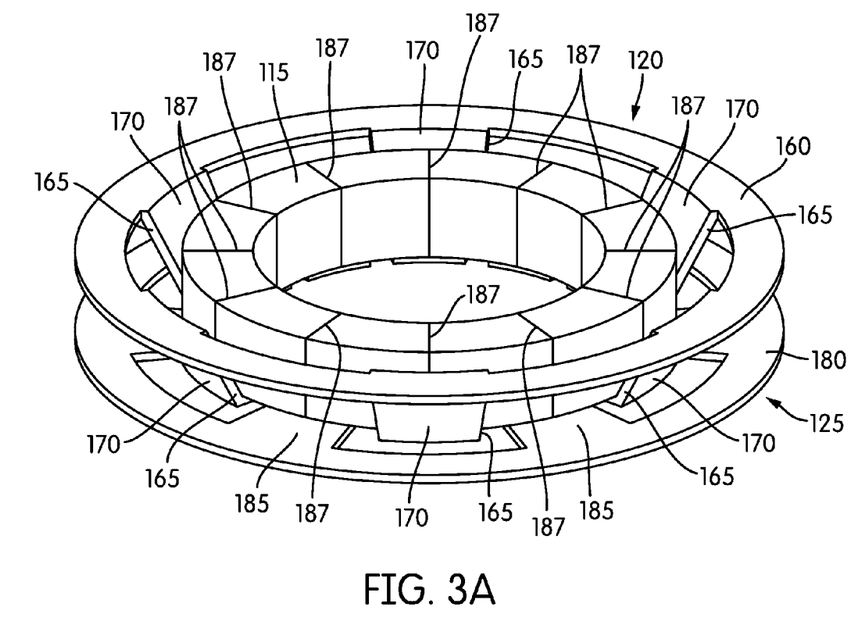
FIG. 3A is a top perspective view of a magnet, a first stator, and a second stator of the sensor of FIG. 1.
Figure 3B:
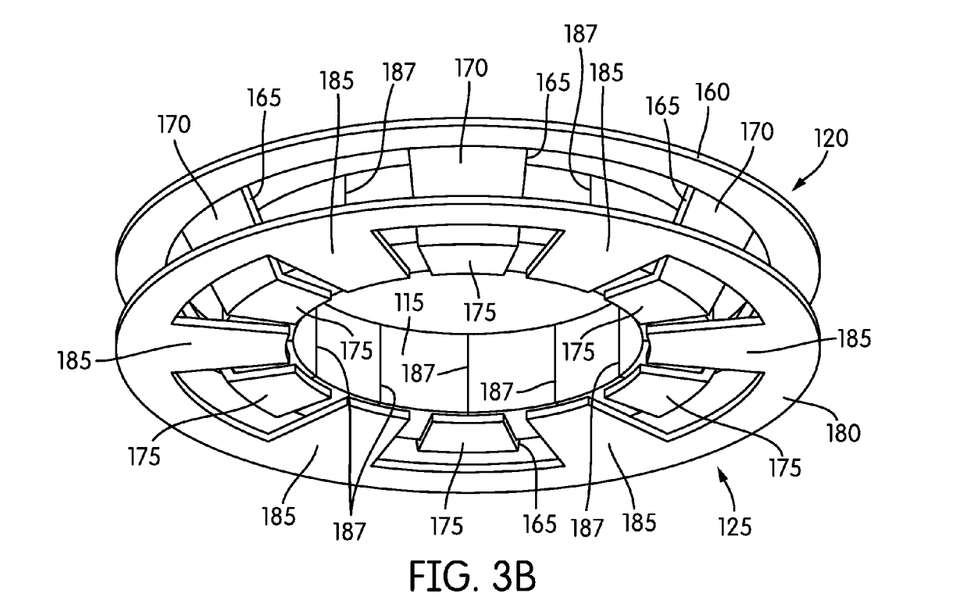
FIG. 3B is a bottom perspective view of a magnet, a first stator, and a second stator of the sensor of FIG. 1.
Figure 3C:
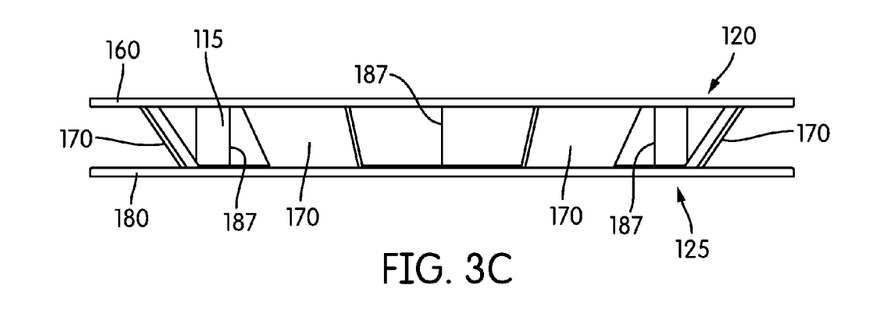
FIG. 3C is a front view of a magnet, a first stator, and a second stator of the sensor of FIG. 1.

FIGS. 3A, 3B, and 3C illustrate the magnet 115, the first stator 120, and the second stator 125 of the sensor 100. As illustrated, the outer portion 155 of the magnet 115 may be surrounded, or encompassed, by the first stator 120. The first stator 120 includes a first ring section, or first horizontal ring section, 160 and a plurality of first teeth 165. The first teeth 165 extend from the first horizontal ring section 160 in a manner that at least a portion of the first teeth 165 are proximate the bottom portion 145 of the magnet 115. The term proximate may be defined as a distance in which a component is not directly in contact with, but at a distance close enough such that the component is able to receive a magnetic flux from a magnet. For example, in one embodiment, the first teeth 165 are located approximately 0.2 mm to 2.0 mm from the bottom portion 145 of the magnet 115, such that the first teeth 165 are able to receive a magnetic flux from the magnet 115. The first teeth 165 extend from the first horizontal ring section 160 in such a manner that a portion of the first teeth are on a first plane while the first horizontal ring section 160 are on a second plane, the first plane being different from the second plane. In the illustrated embodiment, the first teeth 165 include an angled portion 170 and a horizontal portion 175. In such an embodiment, the horizontal portion 175 is on the first plane, while the first horizontal ring section 160 is on the second plane. In other embodiments, the first teeth 165 extend from the first horizontal ring section 160 in a fluid manner such that there are no angled portions.

The second stator 125 is located proximate (for example, in one embodiment, a distance of 0.2 mm to 2.0 mm) the magnet 115 and the first stator 120. As illustrated, the second stator 125 may surround, or encompass, the outer portion 155 of the magnet 115. The second stator 125 includes a second ring section, or second horizontal ring section, 180 and a plurality of second teeth 185. The plurality of second teeth 185 extend from the second horizontal ring section 180 and are also located proximate (for example, in one embodiment, a distance of 0.2 mm to 2.0 mm) the bottom portion 145 of the magnet 115. In the illustrated embodiment, the plurality of second teeth 185 extend from the second horizontal ring section 180 in such a manner that the second teeth 185 and the second horizontal ring section 180 are substantially on the same plane (i.e., a third plane). In some embodiment, the third plane is substantially equal to the first plane. In another embodiment, the plurality of second teeth 185 extend from the second horizontal ring section 180 in such a manner that a portion of the second teeth 185 and the second horizontal ring section 180 are on different planes. In such an embodiment, the portion of the second teeth 185 may be on the same plane as the portion of the first teeth 165.

Additionally, as shown in FIGS. 3A-3C, when there is a net zero torque, a plurality of separation lines 187 of the magnet 115 are aligned rotationally with center lines of the first teeth 165 and the second teeth 185. The separation lines 187 separate the north poles N and south poles S of the magnet 115.

As illustrated in FIG. 1, the first collector 130 and the second collector 135 are located proximate (for example, in one embodiment, a distance of 0.2 mm to 2.0 mm) a portion of the first horizontal ring section 160 and a portion of the second horizontal ring section 180. In the illustrated embodiment, the first collector 130 is located below a portion of the first horizontal ring section 160 and the second collector 135 is located above a portion of the second horizontal ring section 180. Thus, the first collector 130 and the second collector 135 are positioned between a portion of the first horizontal ring section 160 and a portion of the second horizontal ring section 180. In other embodiments, the first collector 130 is positioned above a portion of the first horizontal ring section 160 and the second collector 135 is positioned below a portion of the second horizontal ring section 180.

Figure 4:
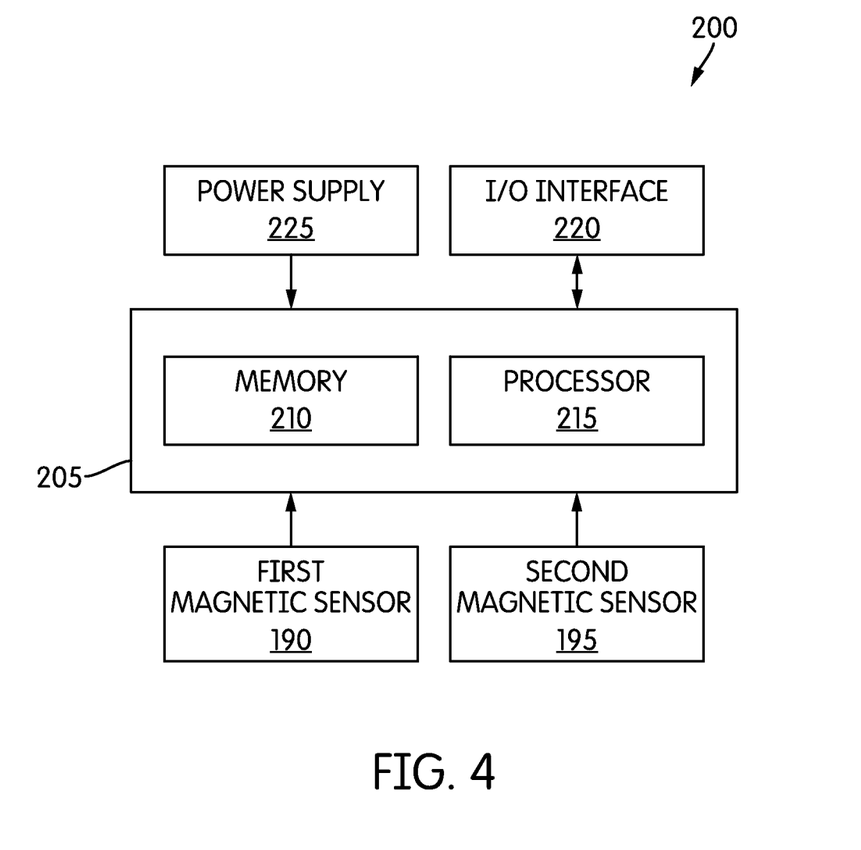
FIG. 4 is a block diagram of a control system of the sensor of FIG. 1.

The first collector 130 and the second collector 135 collect magnetic flux, which travels through the sensor 100. The first collector 130 and the second collector 135 are magnetically coupled to a first magnetic sensor 190 and a second magnetic sensor 195 (FIG. 4). The term magnetically coupled may be defined as a first component being in magnetic communication with a second component, such that the first component is able to receive a magnetic flux from the second component, or vice versa. In some embodiments, the first component is a distance of 0.2 mm to 2.0 mm from the second component. The first and second magnetic sensors 190, 195 are magnetic sensing elements which detect the magnetic flux between, or near to, the first collector 130 and the second collector 135. In some embodiments, the first and second magnetic sensors 190, 195 are Hall-effect sensors.

FIG. 4 illustrates a control system 200. The system 200 includes a controller 205 having a memory 210 and a processor 215. The controller 205 is electrically connected to the first magnetic sensor 190 and the second magnetic sensor 195. The controller 205 receives data from the magnetic sensing elements concerning the magnetic flux, which may include the magnitude and/or the polarity of the magnetic flux, and outputs an analog or digital signal. In some embodiments, the analog or digital data signal relates to a change in the magnetic flux. As illustrated, in some embodiments the controller 205 is further electrically connected to an input/output (I/O) interface 220 and a power supply 225. In some embodiments, the controller 205 is implemented partially or entirely on a semiconductor chip.

The memory 210 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processor 215 is connected to the memory 210 and executes software instructions. Software included in the implementation of the sensor 100 and/or controller 205 can be stored in the memory 210 of the controller 205. The software includes, for example, firmware, one or more applications, program data, filters, rules, one or more program modules, and other executable instructions. The controller 205 is configured to retrieve from memory 210 and execute, among other things, instructions related to the control processes and methods described herein. In other constructions, the controller 205 includes additional, fewer, or different components.

The I/O interface 220 is configured to connect the controller 205 to a peripheral device, such as but not limited to, another controller or computer. The I/O interface 220 may be a wired connection, a wireless connection, or a combination of wired and wireless connections. In some embodiments, the I/O interface 220 is configured to communicate measurement data associated with the sensor 100. In some embodiments, the I/O interface 220 is used to electrically connect the controller 205 to a user-interface. The power supply 225 supplies a nominal voltage to the controller 205, as well as other components of the sensor 100. In some embodiments, the power supply 225 is powered by a first voltage (e.g., from a battery) and provides the nominal voltage to the controller 205 and other components of the sensor 100.

In operation, when torque is exerted on the system, the torsion bar (not shown) regulates the relative angular displacement between the input shaft 105 and the output shaft 110. The relative angular displacement of the input shaft 105 and the output shaft 110 is equivalent to the angular displacement between the magnet 115 (which is coupled to the input shaft 105) and the first and second stators 120, 125 (which are coupled to the output shaft 110). A zero position of the system is the position where there is zero or no torque exerted on the system and zero angular displacement between the magnet 115 and first and second stators 120, 125 (FIGS. 3A-3C). At the zero position, the magnet 115 and first and second stators 120, 125 produce a net zero magnetic flux or a net zero axial magnetic flux.

Figure 5:
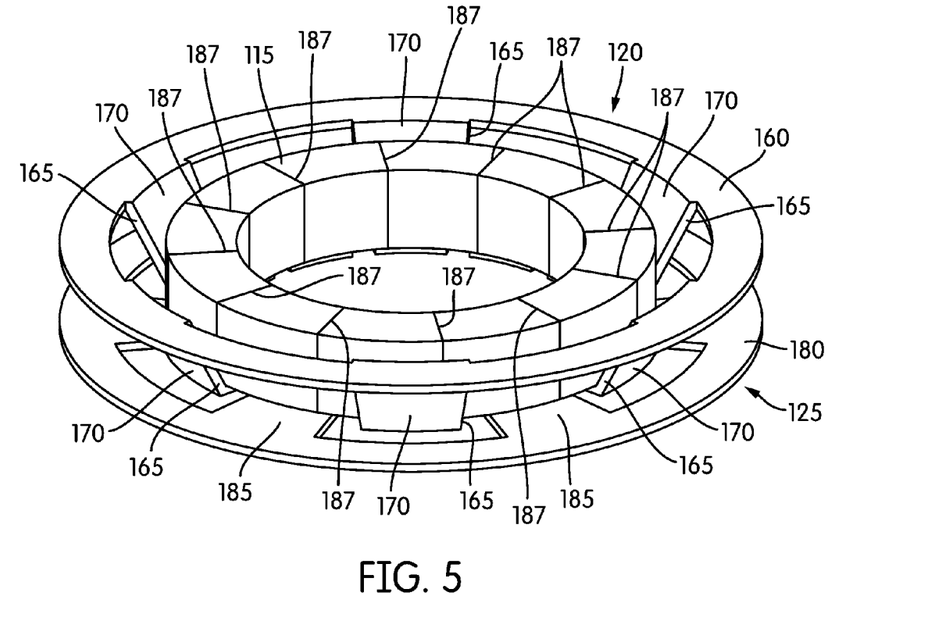
FIG. 5 is a top perspective view of the magnet, the first stator, and the second stator of the sensor of FIG. 1 when there is an angular displacement.

As shown in FIG. 5, when torque is exerted on the system, there is an angular displacement between the magnet 115 and the first and second stators 120, 125. The angular displacement between the magnet 115 and the first and second stators 120, 125 results in the center lines of the first teeth 165 and the second teeth 185 not aligning rotationally with the plurality of separation lines 187. Thus, a change of the magnetic flux (e.g., a change in the magnitude and/or polarity of the magnetic flux) occurs. The greater the angular displacement, the greater the magnetic flux. A first angular displacement in a first rotational direction will result in a first magnetic flux in a first direction, while a second angular displacement in a second rotational direction will result in a second magnetic flux in a second direction, opposite the first direction.

Figure 6:
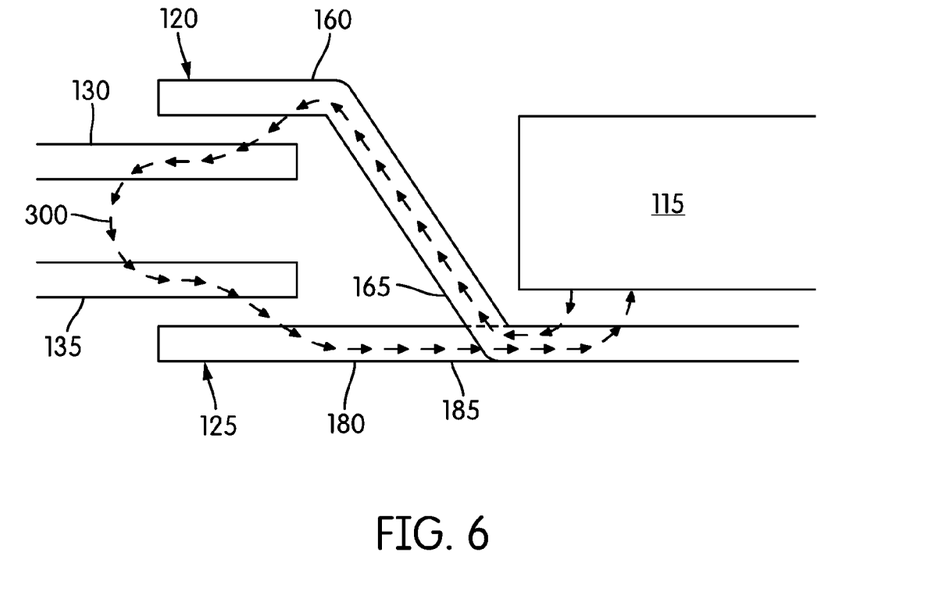
FIG. 6 is a cross-sectional view of the sensor of FIG. 1.

FIG. 6 illustrates a view of the sensor 100 in which one of the plurality of first teeth 165 and one of the plurality of second teeth 185 can be seen. During a first angular displacement in the first direction, a first magnetic flux 300 flows from an N pole of the magnet 115 through the plurality of first teeth 165 to the first horizontal ring section 160 of the first stator 120. The first magnetic flux then flows through the first collector 130 and the second collector 135 to the second horizontal ring section 180 of the second stator 125. The first magnetic flux then flows to the plurality of second teeth 185 of the second stator 125 to an S pole of the magnet 115.

During a second angular displacement in the second direction, a second magnetic flux flows in the opposite direction of the first magnetic flux. The second magnetic flux flows from an N pole of the magnet 115 through the plurality of second teeth 185 to the second horizontal ring section 180 of the second stator 125. The second magnetic flux then flows through the second collector 135 and the first collector 130 to the first horizontal ring section 160 of the first stator 120. The second magnetic flux then flows to the plurality of first teeth 165 of the first stator 120 to an S pole of the magnet 115.

Thus, the invention provides, among other things, a sensor for measuring a torque angle. Various features and advantages of the invention are set forth in the following claims.

What is claimed is:

1. A sensor for measuring a torque angle, the sensor comprising:
   a magnet;
   a first stator including
      a first horizontal ring section located on a first plane, and
      a plurality of first teeth extended from the first horizontal ring section, the plurality of first teeth located on a second plane;
   a second stator including
      a second horizontal ring section located on the second plane, and
      a plurality of second teeth extended from the second horizontal ring section, the plurality of second teeth located on the second plane;
   a first collector located proximate the first horizontal ring section;
   a second collector located proximate the second horizontal ring section; and
   a magnetic sensing element magnetically coupled to the first collector the second collector.

2. The sensor of claim 1, wherein the magnetic sensing element senses a magnetic flux flowing through the first collector and the second collector.

3. The sensor of claim 1, wherein the number of teeth in the plurality of first teeth and the plurality of second teeth depends on the number of poles in the magnet.

4. The sensor of claim 1, wherein a first angular displacement between the magnet and the first stator and the second stator results in a first magnetic flux and a second angular displacement between the magnet and the first stator and the second stator results in a second magnetic flux.

5. The sensor of claim 4, wherein the first angular displacement is opposite the second angular displacement.

6. The sensor of claim 5, wherein the second magnetic flux flows from the magnet, through the plurality of second teeth, the second horizontal ring section, the second collector, the first collector, the first horizontal ring section, the plurality of first teeth, and back to the magnet.

7. The sensor of claim 4, wherein the first magnetic flux flows from the magnet, through the plurality of first teeth, the first horizontal ring section, the first collector, the second collector, the second horizontal ring section, the plurality of second teeth, and back to the magnet.

8. The sensor of claim 1, wherein a zero angular displacement results in a zero magnetic flux.

9. The sensor of claim 1, wherein the magnet has an axial magnetic flux.

10. A sensor for measuring steering shaft torque, the sensor comprising:
    a ring magnet having a top portion, a bottom portion, and an outer portion;
    a first stator including
       a first horizontal ring encompassing the outer portion of the ring magnet, and
       a plurality of first teeth extended from the first horizontal ring section, the plurality of teeth proximate the bottom portion of the ring magnet;
    a second stator including
       a second horizontal ring section encompassing the outer portion of the ring magnet, and
       a plurality of second teeth extended from the second horizontal ring section, the plurality of second teeth proximate the bottom portion of the ring magnet;

a first collector located proximate the first horizontal ring section;

a second collector located proximate the second horizontal ring section; and a magnetic sensing element magnetically coupled to the first collector the second collector.

11. The sensor of claim 10, wherein the plurality of first teeth and the plurality of second teeth are located approximately 0.2 mm to 2.0 mm from the bottom portion of the ring magnet.

12. The sensor of claim 10, wherein the number of teeth in the plurality of first teeth and the plurality of second teeth depends on the number of poles in the magnet.

13. The sensor of claim 10, wherein a first angular displacement between the magnet and the first stator and the second stator results in a first magnetic flux and a second angular displacement between the magnet and the first stator and the second stator results in a second magnetic flux.

14. The sensor of claim 13, wherein the first angular displacement is opposite the second angular displacement.

15. The sensor of claim 14, wherein the second magnetic flux flows from the ring magnet, through the plurality of second teeth, the second horizontal ring section, the second collector, the first collector, the first horizontal ring section, the plurality of first teeth, and back to the ring magnet.

16. The sensor of claim 13, wherein the first magnetic flux flows from the ring magnet, through the plurality of first teeth, the first horizontal ring section, the first collector, the second collector, the second horizontal ring section, the plurality of second teeth, and back to the ring magnet.

17. The sensor of claim 10, wherein a zero angular displacement results in a zero magnetic flux.

18. The sensor of claim 10, wherein the ring magnet has an axial magnetic flux.

19. A method of measuring steering shaft torque, the method comprising:

providing a ring magnet having an axial magnetic flux, an outer portion, and a bottom portion;

providing a first stator having
a first stator ring surrounding the outer portion of the ring magnet, and
a plurality of first teeth extending from the first stator ring, the plurality of first teeth proximate the bottom portion of the ring magnet;

providing a second stator having
a second stator ring surrounding the outer portion of the ring magnet, and
a plurality of second teeth extending from the second stator ring, the plurality of second teeth proximate the bottom portion of the ring magnet;

providing a first collector located proximate the first stator ring;

providing a second collector located proximate the second stator ring; and sensing the axial magnet flux flowing through the first stator, the second stator, the first collector, and the second collector.

20. The method of claim 19, wherein a zero angular displacement between the ring magnet and the first stator and second stator results in a zero axial magnetic flux.

\* \* \* \* \*